(12) United States Patent
Zhang et al.

(10) Patent No.: US 10,016,899 B2
(45) Date of Patent: *Jul. 10, 2018

(54) ELASTIC CORRUGATED PIPE SINGLE-ACTING CYLINDER-DRIVEN MECHANICAL GRIPPER WITH SERIES-CONNECTION LOOSE-LEAF HINGE FRAMEWORK

(71) Applicant: Jiangnan University, Wuxi (CN)

(72) Inventors: Jun Zhang, Wuxi (CN); Qiuping Li, Wuxi (CN); Jiaping Zhang, Wuxi (CN); Lifeng Lu, Wuxi (CN); Bing Lv, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/553,576

(22) PCT Filed: May 11, 2016

(86) PCT No.: PCT/CN2016/081703
§ 371 (c)(1),
(2) Date: Aug. 24, 2017

(87) PCT Pub. No.: WO2016/180337
PCT Pub. Date: Nov. 17, 2016

(65) Prior Publication Data
US 2018/0043544 A1    Feb. 15, 2018

(30) Foreign Application Priority Data

May 12, 2015   (CN) .......................... 2015 1 0240654

(51) Int. Cl.
*B25J 15/10*     (2006.01)
*B25J 15/12*     (2006.01)
(Continued)

(52) U.S. Cl.
CPC ......... *B25J 11/0045* (2013.01); *B25J 15/086* (2013.01); *B25J 15/103* (2013.01); *B25J 15/12* (2013.01); *B25J 17/0275* (2013.01)

(58) Field of Classification Search
CPC ...... B25J 15/0028; B25J 15/02; B25J 15/086; B25J 15/10; B25J 15/103; B25J 15/12;
(Continued)

(56) References Cited

U.S. PATENT DOCUMENTS 2,829,918 A * 4/1958 Stoakes ................... B65B 21/18
                                                                    294/116
4,784,042 A   11/1988 Hardin
(Continued)

FOREIGN PATENT DOCUMENTS

CN      101554730 A     10/2009
CN      103213139 A      7/2013
(Continued)

*Primary Examiner* — Dean J Kramer
(74) *Attorney, Agent, or Firm* — Gokalp Bayramoglu

(57) ABSTRACT

The present invention relates to an elastic corrugated pipe single-acting cylinder-driven mechanical gripper with a series-connection loose-leaf hinge framework. The mechanical gripper consists of a palm and two flexible fingers or a palm and three flexible fingers. The flexible fingers are identical in structure, and each one of the flexible fingers consists of an elastic corrugated pipe single-acting cylinder and a series-connection loose-leaf hinge. Each one of the series-connection loose-leaf hinges has a hinge mandrel equipped with a torsion spring, and the characteristic parameters and pre-tightening angle of the torsion spring are optimally designed according to the features of a grasped object. The mechanical gripper is driven by the elastic corrugated pipe single-acting cylinder to generate a grasping force. The mechanical gripper applies to the grasping of fragile brittle objects, or grasping of objects with varying shapes and dimensions.

4 Claims, 4 Drawing Sheets

(51) Int. Cl.
*B25J 11/00* (2006.01)
*B25J 15/08* (2006.01)
*B25J 17/02* (2006.01)

(58) Field of Classification Search
CPC .... B25J 11/0045; B25J 17/0275; B25J 18/06; Y10S 901/37
See application file for complete search history.

(56) References Cited

U.S. PATENT DOCUMENTS

| | | | | |
|---|---|---|---|---|
| 5,046,773 | A * | 9/1991 | Modesitt | B25J 7/00 294/100 |
| 5,163,804 | A * | 11/1992 | Kobayashi | B66C 1/427 294/196 |
| 8,231,158 | B2 * | 7/2012 | Dollar | B25J 9/104 294/106 |
| 8,596,699 | B2 * | 12/2013 | Sdahl | B25J 15/0253 294/196 |
| 9,724,832 | B2 * | 8/2017 | Zhang | B25J 15/12 |

FOREIGN PATENT DOCUMENTS

| | | |
|---|---|---|
| CN | 104802178 A | 7/2015 |
| CN | 104816303 A | 8/2015 |
| CN | 204725498 U | 10/2015 |
| CN | 204725505 U | 10/2015 |
| EP | 0437792 A1 | 7/1991 |

\* cited by examiner

ELASTIC CORRUGATED PIPE SINGLE-ACTING CYLINDER-DRIVEN MECHANICAL GRIPPER WITH SERIES-CONNECTION LOOSE-LEAF HINGE FRAMEWORK

CROSS REFERENCE TO RELATED APPLICATIONS

This application is the national phase of International Application No. PCT/CN2016/081703, filed on May 11, 2016, which is based upon and claims priority to Chinese Patent Application No. 201510240654.6, filed on May 12, 2015, the entire contents of which are incorporated herein by reference.

FIELD OF THE INVENTION

The present invention relates to an elastic corrugated pipe single-acting cylinder-driven mechanical gripper with a series-connection loose-leaf hinge framework. The mechanical gripper consists of a palm and two flexible fingers or a palm and three flexible fingers. The flexible fingers are identical in structure, and each one of the flexible fingers consists of an elastic corrugated pipe single-acting cylinder and a series-connection loose-leaf hinge. Each one of the series-connection loose-leaf hinges has a hinge mandrel equipped with a torsion spring, and the characteristic parameters and pre-tightening angle of the torsion spring are optimally designed according to the features of a grasped object. The mechanical gripper is driven by the elastic corrugated pipe single-acting cylinder to generate a grasping force. The mechanical gripper applies to the grasping of fragile, brittle objects or the grasping of objects varying with shapes and dimensions, belonging to the application technology field of robots and mechatronics. When connected with a robot body, the mechanical gripper particularly applies to the production and logistic fields for grasping, sorting and packing of foods, agriculture products, and light industrial products.

BACKGROUND OF THE INVENTION

In view of the current mass production situation of the light industry and food industry, a logistical grasping mechanical gripper is needed to meet the logistics and packing demands of irregularly shaped and diversified raw materials, semi-finished products and finished products, and to solve the problems of the high cost and poor operation conditions of single labor manual operation. Diversified objects to be grasped are classified into the following types: (1) flexible objects tending to change in shape (bread, objects in flexible packaging); (2) fragile brittle objects (bird eggs, glass and ceramic products); (3) irregularly shaped objects greatly varying in dimensions (fruits and vegetables); (4) irregularly shaped objects which are mixed at different positions and difficult to sort (wine bottles, cosmetic bottles). From the above mentioned it can be seen that complicated objects greatly vary with material property, shape, dimension and position status. Traditional industrial mechanical grippers are pincer-type or parallel-translation structures, and can only grasp rigid workpieces which are identical in shape and dimensions, keep the same position status, and are not easily broken. A human-simulated gripper needs to sense the space position and shape of a complicated object and needs precise control over the movement and the grasping force; otherwise, the complicated object will be damaged or cannot be reliably grasped. However, current human-simulated grippers are under lab research, have a high cost and impose high requirements for the service environment.

Technical Problems

The elastic corrugated pipe single-acting cylinder-driven mechanical gripper with a series-connection loose-leaf hinge framework of the present invention has the following features: the mechanical gripper has a high degree of flexible freedom and buffering effect on external loads, and therefore has high flexibility self-adaption when grasping complicated objects; meanwhile, the elastic corrugated pipe single-acting cylinder operates smoothly and responds quickly because of not being stressed by the friction forces generated by a cylinder piston and a rubber seal on a piston rod.

The key components of the mechanical gripper of the present invention are flexible fingers, which are also called flexible joints. Prior to the present invention, a patent (articulated flexible manipulator, 200810023616.5) disclosed a rubber corrugated pipe expandable loading-type pneumatic artificial muscle driver-driven flexible bending joint with a loose-leaf hinge frame, with the following defects: (1) without structural amplification of the radial force, along with the increase in the angular displacement of the loose-leaf hinge when the loose-leaf hinge is driven by the artificial muscle, the bigger the pressure increment in the inner cavity of the artificial muscle required by the increment of the angular displacement in a unit is, the more difficult it is for the loose-leaf hinge to bend, which means the smaller the slopes of the two angular displacement-air pressure curves of the series-connection loose-leaf hinge of the flexible finger are; (2) the position of the loose-leaf hinge framework where the driving force is applied cannot be adjusted, so the object grasping ability is limited. A patent application (pneumatic boost serial loose hinge flexible multi-finger claw, 201310123157.9) discloses a mechanical gripper driven by a cylinder, with the following defects: (1) due to two sliding friction forces generated by a cylinder piston and by a rubber seal on a piston rod, the dynamic and static friction coefficients of the mechanical gripper greatly vary with each other, and the sliding friction force is involved with the stress on the piston rod and changes dramatically, so the synchronism control over the cylinder piston movement of the three fingers is complicated, and the position servo control is difficult; (2) the flexible fingers of the mechanical grippers are vertically installed, apply to the pinching mode of "fingertip touch" only, and cannot employ the envelop gripping mode of "touch with fingers and palm at several positions", so the application scope is small.

SUMMARY OF THE INVENTION

The present invention overcomes the above defects. The mechanical gripper of the present invention has two or three flexible fingers, and the flexible fingers are identical in structure. In principle, the flexible fingers are four-hinge five-rod structures, wherein the five rods include a drive rod (elastic corrugated pipe single-acting cylinder 10), three loose-leaf rods formed by series-connection loose-leaf hinges 4 which have large torsion springs 5 and small torsion springs 6 (a combination of an upper leaf and a bendable plate 3, a combination of a middle leaf, a lower leaf and a hinge base 8), and two tension rods 9; and the four hinges include two hinges of the series-connection loose-leaf hinges 4 which have large torsion springs 5 and small torsion springs 6, and two hinges at the two ends of each one of the two tension rods 9.

The solution of the present invention is as follows:

A structure of a mechanical gripper of the present invention can be seen in FIGS. 1 and 2, consisting of two identical flexible fingers and a palm plate 1. The two identical flexible fingers are symmetrically installed in guide slots of the palm plate 1 on the left and right, with a center distance defined by a center hole on the palm plate 1. Each one of the flexible fingers consists of a finger root 2, a bendable plate 3, a series-connection loose-leaf hinge 4, a large torsion spring 5, a small torsion spring 6, a pressure plate 7, a hinge base 8, two tension rods 9, and an elastic corrugated pipe single-acting cylinder 10. The mechanical gripper of the present invention has the following characteristics. The finger roots 2 perform guidance in the guide slots of the palm plate 1; screws pass through kidney slots on the finger roots 2 to fix the finger roots 2 on the palm plate 1; the kidney slots on the finger roots 2 can be used to adjust the center distance of the flexible fingers, and the upper leaf of the series-connection loose-leaf hinge 4 between the bendable plate 3 and the finger roots 2 by using the screws. The large torsion springs 5 and the small torsion springs 6 are respectively installed on two hinge mandrels of the series-connection loose-leaf hinge 4, and the middle leaf of the series-connection loose-leaf hinge 4 have protruding edges at two ends, ensuring that the series-connection loose-leaf hinge 4 is flat and straight in the initial state, so the series-connection loose-leaf hinge 4 in the initial state has the force for pre-tightening the large torsion springs 5 and the small torsion springs 6, but without angular displacement. The pressure plate 7 has four screw holes for four screws, and four screws pass through the hinge base 8 to clamp and fasten the lower leaf of the series-connection loose-leaf hinge 4 on the pressure plate 7; the lower leaf of the series-connection loose-leaf hinge 4 has no holes, so the installation position of the hinge base 8 on the lower leaf of the series-connection loose-leaf hinge 4 is conveniently adjusted; and the lower leaf of the series-connection loose-leaf hinge 4 has a curved plane at the bottom end. The two ends of each one of the two tension rods 9 are both hinges, respectively forming a hinged connection together with the hinge base 8 and a hinge support 11a on the elastic corrugated pipe single-acting cylinder 10.

Another structure of a mechanical gripper of the present invention can be seen in FIG. 3, consisting of three identical flexible fingers and a palm plate 1. The three identical flexible fingers are uniformly installed in guide slots of the palm plate 1 at an interval of 120 DEG, with center distances defined by a center hole on the palm plate 1. The structure of the flexible fingers is identical with the above mentioned structure. Each one of the flexible fingers consists of a finger root 2, a bendable plate 3, a series-connection loose-leaf hinge 4, a large torsion spring 5, a small torsion spring 6, a pressure plate 7, a hinge base 8, two tension rods 9, and an elastic corrugated pipe single-acting cylinder 10.

As shown in FIGS. 4 and 5, the elastic corrugated pipe single-acting cylinder 10 consists of a bottom cover 1a, a rubber pad 2a, a cylinder base 3a, a hoop 4a, an elastic corrugated pipe 5a, a guide sleeve 6a, a linear bearing 7a, a threaded cover 8a, a guide rod 9a, a guide rod base 10a, a hinge support 11a, a compression spring 12a, a nylon regulating plate 13a, a spring cover 14a, a socket head cap screw 15a, a sealing ring 16a and a union elbow 17a. The elastic corrugated pipe single-acting cylinder has the following characteristics. The bottom cover 1a, the rubber pad 2a and the cylinder base 3a are fixed together through screws. A flange at the upper end of the guide sleeve 6a is pressed by the cylinder base 3a on the rubber pad 2a, and a column below the flange of the guide sleeve 6a is in minimum hole clearance with the cylinder base 3a, ensuring the coaxiality of the guide sleeve 6a and the cylinder base 3a. The rubber elastic corrugated pipe 5a is fixed on the cylinder base 3a and the guide rod base 10a by using the hoop 4a. The linear bearing 7a guiding the guide rod 9a is installed in the guide sleeve 6a. The guide sleeve 6a is capped by the threaded cover 8a in a screw manner such that the linear bearing 7a is axially fixed. The guide rod 9a is installed on the guide rod base 10a. The compression spring 12a is disposed inside the guide sleeve 6a. The nylon regulating plate 13a and the spring cover 14a are fixed on the guide rod 9a by the socket head cap screw 15a. The compression spring 12a is pressed by the spring cover 14a. The pre-tension of the compression spring 12a and the journey of the elastic corrugated pipe single-acting cylinder 10 can be regulated by replacing the nylon regulating plates 13a with a different thickness. The hinge support 11a is installed at the symmetric center of the guide rod base 10a. The phase angle of the elastic corrugated pipe 5a on the guide rod base 10a can be adjusted to ensure that the hinge support 11a remains on the same plane together with the hinge base 8 and the two tension rods 9. The union elbow 17a is equipped on the cylinder base 3a in a threaded way. The sealing ring 16a is disposed between the union elbow 17a and the cylinder base 3a.

As shown in FIGS. 6 and 7, the palm plate 1 has four guide slots; the left guide slots are symmetric to right guide slots; the left guide slots and the two right guide slots on the upper and lower parts are uniformly distributed at an interval of 120 DEG; the four guide slots have four threaded holes, and the four threaded holes are identical in center distance.

BENEFICIAL EFFECT

Compared with the prior art, the present invention has the following advantages:

(1) The elastic corrugated pipe single-acting cylinder 10 is not stressed by the sliding friction force generated by the rubber seal, so the synchronism control of the piston movement of the three fingers is relatively simple, and the position servo control is not difficult.

(2) The elastic corrugated pipe single-acting cylinder 10 is not stressed by the sliding friction force generated by the rubber seal and adopts the guide mode of the rolling friction of the linear bearing, so the energy consumption is small, the response is quick, and the low-speed creeping phenomenon does not exist.

(3) The flexible fingers of the mechanical gripper are installed in an inclined way, not only applying the pinching mode of "fingertip touch", but also employing the envelop gripping mode of "touch with fingers and palm at several positions", so the application scope is relatively wide.

(4) The rubber corrugated pipe of the elastic corrugated pipe single-acting cylinder 10 is uniformly stressed, so the service life is long.

(5) The rubber corrugated pipe and the hoop of the elastic corrugated pipe single-acting cylinder 10 are still sleeved on the guide sleeve 6a and the guide rod 9a even in the separated state, so the structure is safe and reliable.

DETAILED DESCRIPTION OF THE INVENTION

Figure 1:
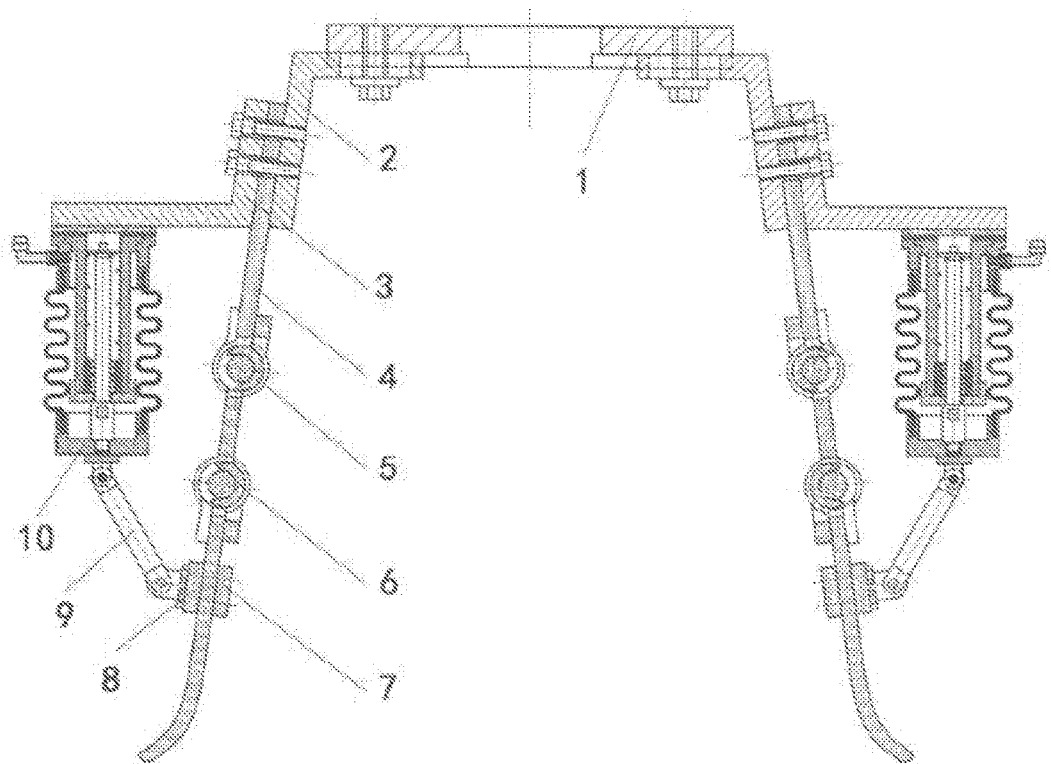
FIG. 1 is a front view of an elastic corrugated pipe single-acting cylinder-driven mechanical gripper with a series-connection loose-leaf hinge framework.
Figure 2:
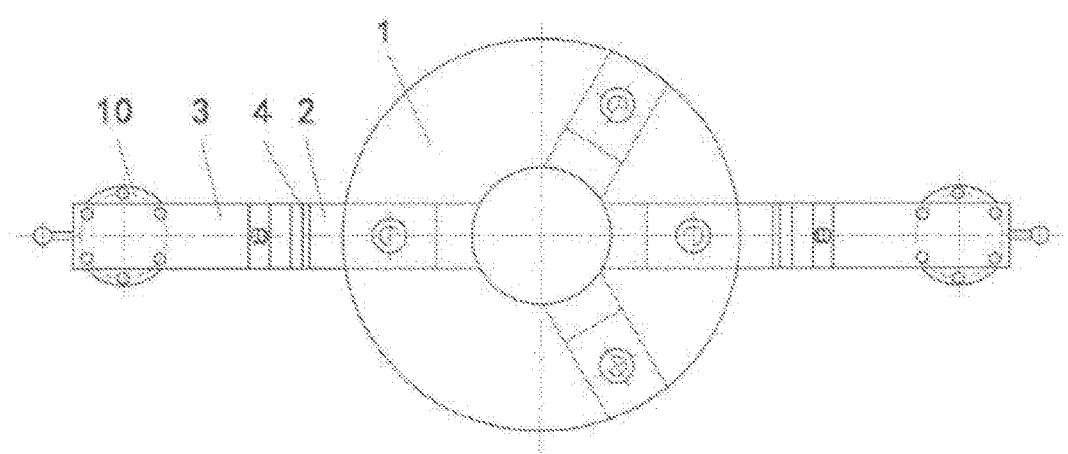
FIG. 2 is a vertical view of two fingers of the elastic corrugated pipe single-acting cylinder-driven mechanical gripper with a series-connection loose-leaf hinge framework in the installation status.
Figure 4:
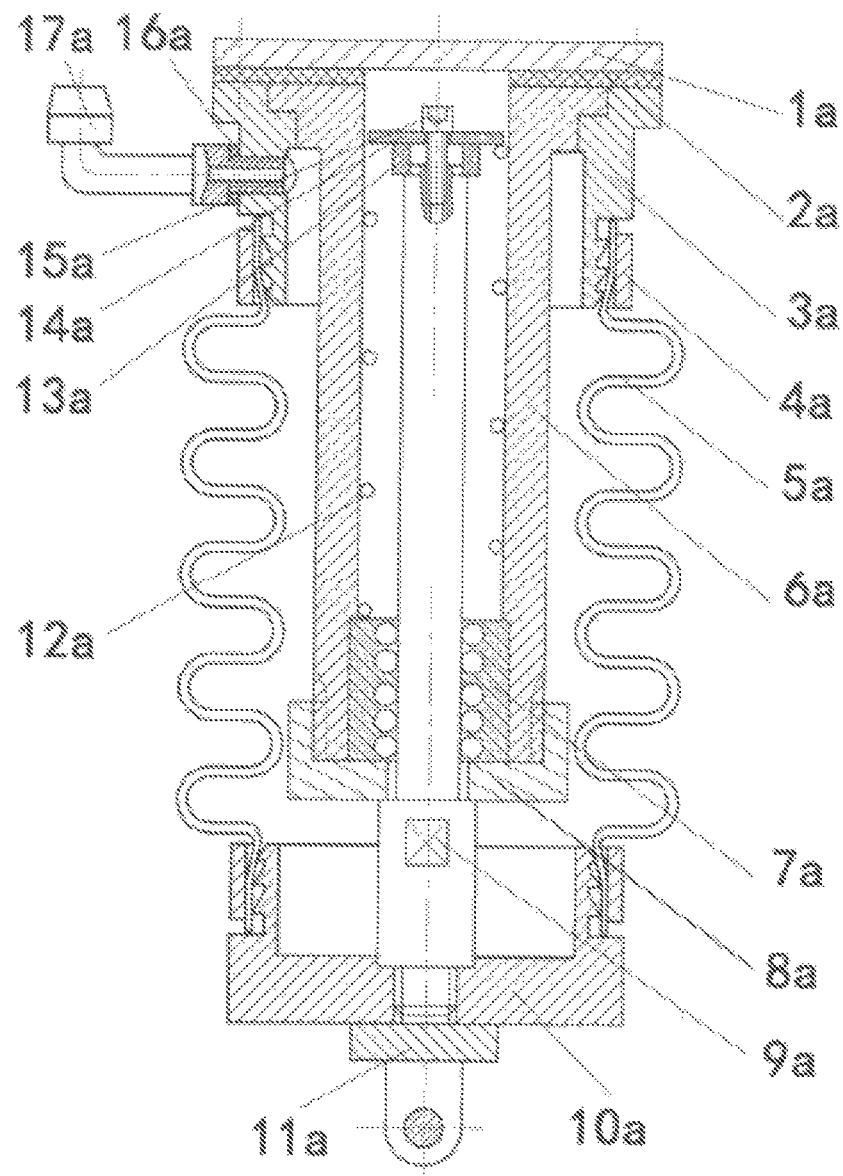
FIG. 4 is a front view of an elastic corrugated pipe single-acting cylinder of the elastic corrugated pipe single-acting cylinder-driven mechanical gripper with a series-connection loose-leaf hinge framework.
Figure 5:
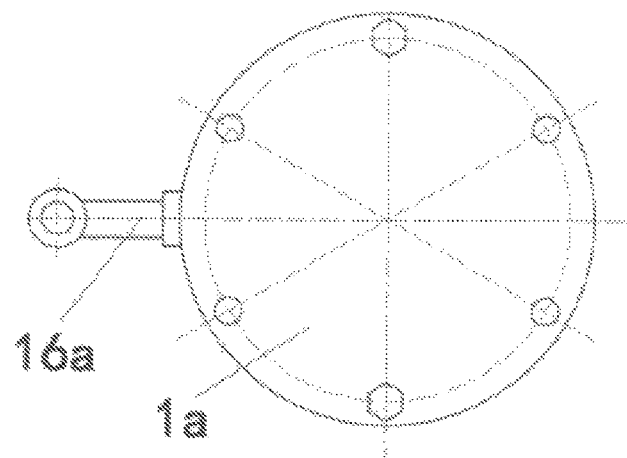
FIG. 5 is a vertical view of the elastic corrugated pipe single-acting cylinder of the elastic corrugated pipe single-acting cylinder-driven mechanical gripper with a series-connection loose-leaf hinge framework.
Figure 6:
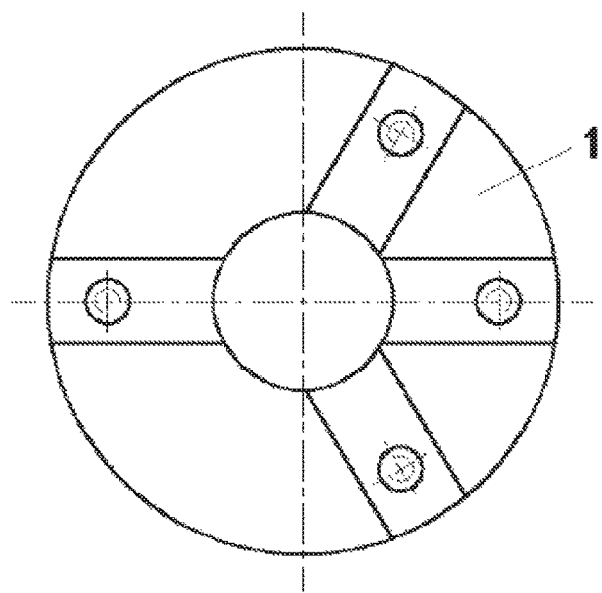
FIG. 6 is a top view of a palm plate of the elastic corrugated pipe single-acting cylinder-driven mechanical gripper with a series-connection loose-leaf hinge framework.
Figure 7:
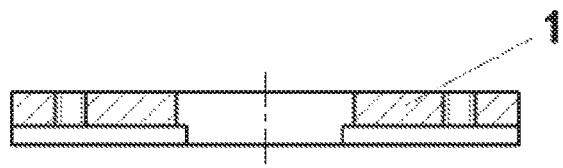
FIG. 7 is a front view of the palm plate of the elastic corrugated pipe single-acting cylinder-driven mechanical gripper with a series-connection loose-leaf hinge framework.

Below is the working principle and working process of the present invention:

As shown in FIGS. 1-2 and 4-5, the working principle of the present invention is as follows:

For long and cuboid complicated objects, after theoretical analyses and experimental studies, determination of the safety scope of the grasping force, and optimal design of the structural dimensions of the mechanical gripper, the characteristic parameters and pre-tensioning angles of the large torsion springs 5 and the small torsion springs 6, and the characteristic parameters and pre-tension of the compression spring 12a are carried out according to the variable scopes of shapes and dimensions and the material of objects to be grasped, thus determining the dimensions of the installation positions of the flexible fingers on the palm plate 1 and determining the dimensions of the installation position of the hinge base 8 on the lower leaf of the series-connection loose-leaf hinge 4.

The structural dimensions of the mechanical gripper with the series-connection loose-leaf framework and the elastic parameters of the large torsion springs 5, the small torsion springs 6, and the compression spring 12a are comprehensively designed upon specific grasping objects, so it is needed to ensure that the resultant force and resultant moment generated by the three spring forces on the guide rod 9a during return do not generate self-locking (in order to prevent self-locking, the linear bearing 7a is adopted to increase the pressure angle). Thus, the guide rod 9a of the elastic corrugated pipe single-acting cylinder 10 can return to the original position, and the series-connection loose-leaf hinge 4 of the mechanical gripper returns to the initial straight status.

Moreover, the elastic corrugated pipe is initially "U" shaped, and when assembled to serve as a part of the elastic corrugated pipe single-acting cylinder 10, the elastic corrugated pipe is initially "Q" shaped, thus obtaining a relatively large journey.

As shown in FIGS. 1-2 and 4-5, the working process of the present invention is as follows: (1) When the air pressure in the elastic corrugated pipe single-acting cylinder 10 is the set pressure, the air pressure overcomes the elastic forces of the large torsion springs 5, the small torsion springs 6, and the compression spring 12a in the elastic corrugated pipe single-acting cylinder 10, so the required grasping contact force is reached and the grasping state is kept; in the grasping state, due to the synergistic effect of the elastic forces of the large torsion springs 5 and the small torsion springs 6, two hinges in series connection that have degree of freedom generate flexible movement, so mechanical gripper has self-adaption to the grasped object. (2) When the air pressure in the elastic corrugated pipe single-acting cylinder 10 is released, the mechanical gripper with the series-connection loose-leaf hinge framework returns to the initial state by the joint effect of the large torsion springs 5, the small torsion springs 6 and the compression spring 12a in the elastic corrugated pipe single-acting cylinder 10.

Figure 3:
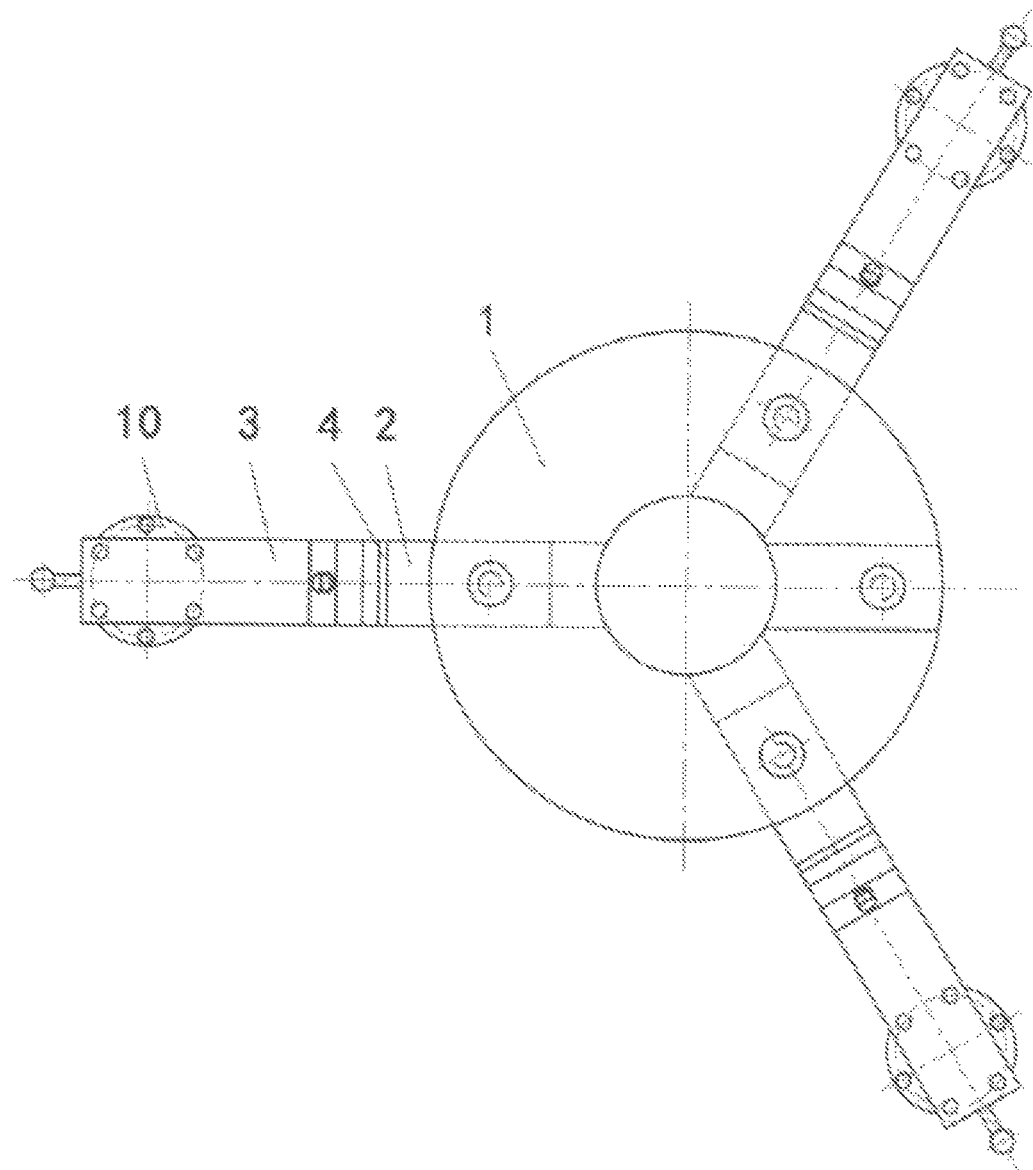
FIG. 3 is a vertical view of three fingers of the elastic corrugated pipe single-acting cylinder-driven mechanical gripper with a series-connection loose-leaf hinge framework in the installation status.

As shown in FIGS. 1, 3 and 4-5, for spherical and short cylindrical complicated objects, design and regulation are carried out by the above steps after experimental studies and theoretical analyses.

What is claimed is:

1. An elastic corrugated pipe single-acting cylinder-driven mechanical gripper with a series-connection loose-leaf hinge framework, comprising:
   a structure of a mechanical gripper, including two identical flexible fingers, the two identical flexible fingers being symmetrically installed in guide slots of a palm plate on a left side and a right side, with a center distance defined by a center hole on the palm plate;
   wherein each of the two flexible fingers consists of
      a finger root,
      a bendable plate,
      a series-connection loose-leaf hinge,
      a large torsion spring,
      a small torsion spring,
      a pressure plate,
      a hinge base,
      two tension rods, and
      an elastic corrugated pipe single-acting cylinder;
   wherein
   the finger root is configured to perform guidance in the guide slot of the palm plate;
   a first screw passes through a kidney slot on the finger root to fix the finger root on the palm plate;
   the kidney slot on the finger root is used to adjust the center distance of the flexible finger,
   an upper leaf of the series-connection loose-leaf hinge between the bendable plate and the finger root by using a second screw;
   the large torsion spring and the small torsion spring are respectively installed on two hinge mandrels of the series-connection loose-leaf hinge;
   a middle leaf of the series-connection loose-leaf hinge has protruding edges at two ends, ensuring that the series-connection loose-leaf hinge is flat and straight in an initial state, so that the series-connection loose-leaf hinge in the initial state has forces for pre-tightening the large torsion spring and the small torsion spring without angular displacement;
   the pressure plate has four screw holes for four screws;
   four screws pass through the hinge base to clamp and fasten a lower leaf of the series-connection loose-leaf hinge on the pressure plate;
   the lower leaf of the series-connection loose-leaf hinge has no holes, so that an installation position of the hinge base on the lower leaf of the series-connection loose-leaf hinge is convenient to be adjusted;
   the lower leaf of the series-connection loose-leaf hinge has a curved plane at a bottom end;

two ends of each one of the two tension rods are both hinges, respectively forming hinged connection together with the hinge base and a hinge support on the elastic corrugated pipe single-acting cylinder;

wherein, the elastic corrugated pipe single-acting cylinder consists of
- a bottom cover,
- a rubber pad,
- a cylinder base,
- a hoop,
- an elastic corrugated pipe,
- a guide sleeve,
- a linear bearing,
- a threaded cover,
- a guide rod,
- a guide rod base,
- a hinge support,
- a compression spring,
- a nylon regulating plate,
- a spring cover,
- a socket head cap screw,
- a sealing ring, and
- a union elbow;

wherein
the bottom cover, the rubber pad and the cylinder base are fixed together through screws;
a flange at an upper end of the guide sleeve is pressed by the cylinder base on the rubber pad a column below the flange of the guide sleeve is in minimum hole clearance with the cylinder base, ensuring coaxiality of the guide sleeve and the cylinder base;
the rubber elastic corrugated pipe is fixed on the cylinder base and the guide rod base by using the hoop;
the linear bearing guiding the guide rod is installed in the guide sleeve;
the guide sleeve is capped by the threaded cover in a screw manner such that the linear bearing is axially fixed;
the guide rod is installed on the guide rod base;
the compression spring is disposed inside the guide sleeve;
the nylon regulating plate and the spring cover are fixed on the guide rod by the socket head cap screw;
the compression spring is pressed by the spring cover;
a pre-tension of the compression spring and a journey of the elastic corrugated pipe single-acting cylinder are capable of being regulated by replacing nylon regulating plates with a different thickness;
the hinge support is installed at a symmetric center of the guide rod base;
a phase angle of the elastic corrugated pipe on the guide rod base is capable of being adjusted to ensure that the hinge support remains on the same plane together with the hinge base and the two tension rods;
the union elbow is equipped on the cylinder base in a threaded way; and
the sealing ring is disposed between the union elbow and the cylinder base.

2. The elastic corrugated pipe single-acting cylinder-driven mechanical gripper with a series-connection loose-leaf hinge framework according to claim 1, wherein
the palm plate is provided with four guide slots;
the four guide slots have four threaded holes; and
the four threaded holes are identical in center distance.

3. An elastic corrugated pipe single-acting cylinder-driven mechanical gripper with a series-connection loose-leaf hinge framework, comprising:

a structure of mechanical gripper, including three identical flexible fingers, the three identical flexible fingers being uniformly installed in guide slots of a palm plate at an interval of 120°, with center distances defined by a center hole on the palm plate;

each one of the three flexible fingers consisting of
- a finger root,
- a bendable plate,
- a series-connection loose-leaf hinge,
- a large torsion spring,
- a small torsion spring,
- a pressure plate,
- a hinge base,
- two tension rods, and
- an elastic corrugated pipe single-acting cylinder;

wherein
the finger root is configured to perform guidance in the guide slot of the palm plate;
a first screw passes through a kidney slot on the finger root to fix the finger root on the palm plate;
the kidney slot on the finger root is used to adjust the center distance of the flexible finger,
an upper leaf of the series-connection loose-leaf hinge between the bendable plate and the finger root by using a second screw;
the large torsion spring and the small torsion spring are respectively installed on two hinge mandrels of the series-connection loose-leaf hinge;
a middle leaf of the series-connection loose-leaf hinge has protruding edges at two ends, ensuring that the series-connection loose-leaf hinge is flat and straight in an initial state, so that the series-connection loose-leaf hinge in the initial state has forces for pre-tightening the large torsion spring and the small torsion spring, without angular displacement;
the pressure plate has four screw holes for four screws;
four screws pass through the hinge base to clamp and fasten a lower leaf of the series-connection loose-leaf hinge on the pressure plate;
the lower leaf of the series-connection loose-leaf hinge has no holes, so that an installation position of the hinge base on the lower leaf of the series-connection loose-leaf hinge is convenient to be adjusted;
the lower leaf of the series-connection loose-leaf hinge has a curved plane at a bottom end;
two ends of each one of the two tension rods are both hinges, respectively forming hinged connection together with the hinge base and a hinge support on the elastic corrugated pipe single-acting cylinder;
the elastic corrugated pipe single-acting cylinder consisting of
- a bottom cover,
- a rubber pad,
- a cylinder base,
- a hoop,
- an elastic corrugated pipe,
- a guide sleeve,
- a linear bearing,
- a threaded cover,
- a guide rod,
- a guide rod base,
- a hinge support,
- a compression spring,
- a nylon regulating plate,
- a spring cover,
- a socket head cap screw,
- a sealing ring, and
- a union elbow;

wherein
the bottom cover, the rubber pad and the cylinder base are fixed together through screws;
a flange at an upper end of the guide sleeve is pressed by the cylinder base on the rubber pad;
a column below the flange of the guide sleeve is in minimum hole clearance with the cylinder base, ensuring coaxiality of the guide sleeve and the cylinder base;
the rubber elastic corrugated pipe is fixed on the cylinder base and the guide rod base by using the hoop;
the linear bearing guiding the guide rod is installed in the guide sleeve;
the guide sleeve is capped by the threaded cover in a screw manner such that the linear bearing is axially fixed;
the guide rod is installed on the guide rod base;
the compression spring is disposed inside the guide sleeve;
the nylon regulating plate and the spring cover are fixed on the guide rod by the socket head cap screw;
the compression spring is pressed by the spring cover;
pre-tension of the compression spring and a journey of the elastic corrugated pipe single-acting cylinder are capable of being regulated by replacing nylon regulating plates with a different thickness;
the hinge support is installed at a symmetric center of the guide rod base;
a phase angle of the elastic corrugated pipe on the guide rod base is capable of being adjusted to ensure that the hinge support remains on the same plane together with the hinge base and the two tension rods;
the union elbow is equipped on the cylinder base in a threaded way; and
the sealing ring is disposed between the union elbow and the cylinder base.

4. The elastic corrugated pipe single-acting cylinder-driven mechanical gripper with a series-connection loose-leaf hinge framework according to claim 3, wherein
the palm plate is provided with four guide slots;
the four guide slots have four threaded holes; and
the four threaded holes are identical in center distance.

* * * * *